United States Patent [19]

Unigovsky et al.

[11] 4,269,552

[45] May 26, 1981

[54] APPARATUS FOR REMOVING A WELDING BULGE FROM RESISTANCE WELDED PIPES

[76] Inventors: Mikhail R. Unigovsky, ulitsa Pushkinskaya, 21, kv. 31; Evgeny V. Rulevsky, ulitsa Vyshgorodskaya, 30, kv. 64, both of Kiev; Georgy A. Arendt, 9 Parkovaya ulitsa, 6, korpus 1, kv. 36, Moscow; Vladimir G. Chirskov, ulitsa Saltykova-Schedrina, 34, kv. 5, Tjumen; Julian K. Konovalov, ulitsa Sholom-Aleikhema, 1, kv. 5, Kiev; Vasily T. Ivanov, ulitsa Shevchenko, 5, kv. 4, Borispol Kievskoi oblasti; Isaak Y. Nemirovsky, ulitsa Kopylovskaya, 21, kv. 67, Kiev; Sergei I. Kuchuk-Yatsenko, ulitsa Filatova 1/22, kv. 47, Kiev; Vasily A. Sakharnov, ulitsa Solomenskaya, 41, kv. 93, Kiev; Alexandr B. Kheinis, ulitsa Frunz, 131, kv. 82, Kiev, all of U.S.S.R.

[21] Appl. No.: 37,495

[22] Filed: May 10, 1979

[30] Foreign Application Priority Data

May 22, 1978 [SU] U.S.S.R. ............................... 2621708

[51] Int. Cl.³ ................................................ B23C 3/12
[52] U.S. Cl. .................................... 409/140; 409/179; 409/296; 409/300
[58] Field of Search ............... 409/140, 139, 179, 180, 409/189, 296, 300

[56] References Cited

U.S. PATENT DOCUMENTS

| 2,842,238 | 7/1958 | Shaw et al. | 409/179 |
| 4,091,514 | 5/1978 | Motes-Conners et al. | 409/189 X |

FOREIGN PATENT DOCUMENTS 589090  1/1978  U.S.S.R. .................................... 409/140

*Primary Examiner*—Z. R. Bilinsky
*Attorney, Agent, or Firm*—Lackenbach, Lilling & Siegel

[57] ABSTRACT

A welding bulge removing apparatus comprises a ring-shaped carrier adapted to be placed by means of rollers on welded pipes at the weld bulge, and being provided with a circumferential guideway and gear rim. It also comprises motor-operated carriages each having a driving gear wheel and support rollers. Mounted on the carriages are milling cutter units movable to and from the weld bulge. The gear wheel and the support rollers are brought respectively into engagement with the gear rim and the circumferential carrier.

1 Claim, 1 Drawing Figure

U.S. Patent   May 26, 1981   4,269,552
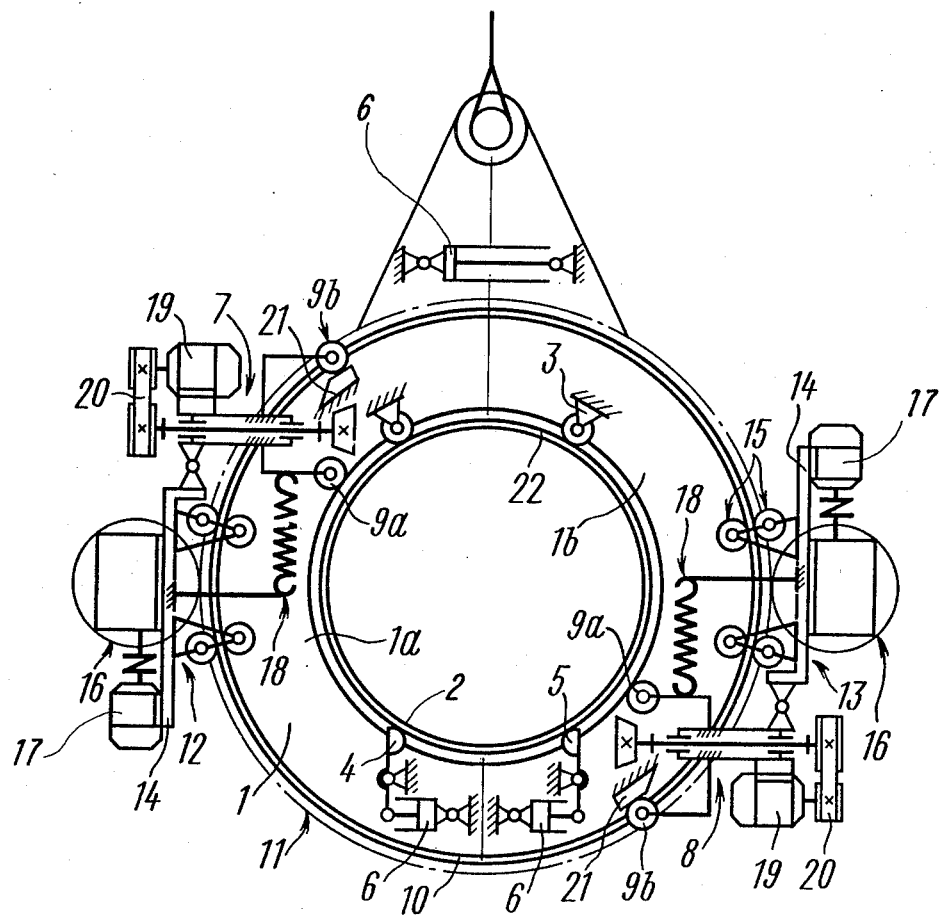

APPARATUS FOR REMOVING A WELDING BULGE FROM RESISTANCE WELDED PIPES

BACKGROUND OF THE INVENTION

The present invention is related to an apparatus for removing a welding bulge, and in particular, to an apparatus for removing a welding bulge from resistance welded pipes while laying pipelines.

Variously constructed and modified apparatus for removing a welding bulge, intended for operation in specific conditions, are well known in the art.

The invention is directed to the apparatus designed for field operation while laying pipelines for the long-distance transportation of petroleum and gas. More specifically, the present invention has to do with an apparatus designed for removing a welding bulge from resistance welded pipes under the aforesaid conditions.

Apparatus thus far proposed as exemplified in USSR inventor's Certificates Nos. 507373, 468729, 468730, generally comprise impact or cutting tools, motion and static parts, and mechanisms for driving the tools.

Such apparatus, particularly those intended for large-diameter (over 1,000 mm) pipes, are of large dimensions and of considerable weight and therefore present problems in service and are greatly time-consuming for setup under field conditions in pipeline construction. As a consequence, their performance has proved to be lower than that of the electric resistance welding machines, which machines together with the apparatus in question form part of a single production complex.

Known in the prior art is an apparatus for removing a welding bulge from resistance welded pipes as disclosed in USSR Inventor's Certificate No. 589090, said apparatus comprising a ring-shaped carrier adapted to be placed at the bulge zone in spaced circumferential relationship to the welded pipes and being provided with centering rollers, as well as milling cutter units pivotally associated with the carrier for radial movement to and from the weld bulge and said milling cutter units being provided with former rollers.

The centering rollers are motor-operated, enabling the carrier to be turned about the pipes at the weld bulge zone.

In operation, the motor-operated centering rollers by rolling over the pipes impart rotary motion to the carrier. As this takes place, the milling cutter units will approach the weld bulge and the carrier will provide the feed of this tool.

Though simple in construction this apparatus still suffers from a number of disadvantages.

Inasmuch as the motor-operated centering rollers of the known apparatus are supported on the welded pipes, the reliability of the drive for feeding the milling cutter units is completely dependent on the engagement of the motor-operated rollers with the surface of the pipe, providing the drive power is sufficient to defeat resistance of the weld material to the milling cutter units.

The reliability of the roller-pipe engagement is in turn dependent on the surface condition of the pipes and the rollers, since under field conditions there may be ice formation, oil film, and other friction-affecting deposition formations.

This brings about vibration in the tools of the milling cutter units and a drop in the speed of feeding thereof, which in turn impair performance of the prior art apparatus. The problem of performance appears to be even more acute by appreciation of the fact that in view of the above the welding bulge has to be removed in more than one pass.

The present invention contemplates the provision of an apparatus for removing a welding bulge from end-to-end resistance welded pipes which is simple in construction, and offers higher reliability and performance characteristics.

SUMMARY OF THE INVENTION

An object of the present invention is to provide an apparatus of the kind specified, which exhibits a higher performance as compared to that of the apparatus of a similar design.

Another object of the present invention is to provide an apparatus for removing a welding bulge from end-to-end resistance welded pipes, and which is of a simple construction.

A further object of the invention is to provide a more reliable apparatus for removing a welding bulge.

These and other objects of the invention, which will be clear from the following detailed description of an embodiment of the inventive concept, taken in conjunction with the accompanying drawing, are attained in an apparatus for removing a welding bulge from resistance welded pipes, which comprises motor-operated carriages each including support rollers for the same and a driving gear wheel, and a ring-shaped carrier having a circumferential guideway and a gear rim both adjacent the other periphery of the same carrier and extending the length thereof and brought into engagement with the support rollers and the driving gear wheel of the motor-operated carriage respectively.

This carrier is constructed of two half sections which are articulated at one end thereof and furnished with clamping means for fixing the carrier on the welded pipes at the other end, and having cams diametrically opposed one to the other. In operation, this arrangement provides for movement of the carriages, while the carrier remains immobilized.

Such apparatus as hereinabove set forth, being specifically adapted for an in-the-field operation while laying pipelines, provides for the required performance and reliability as well as a higher quality surface after bulge removal. In the course of test runs of the apparatus, about 2000 butt welds between pipes of a large diameter (1420 mm) were machined, and the performance was 5 to 6 butt welds per hour.

DETAILED DESCRIPTION OF THE SOLE FIGURE OF THE DRAWING AND THE PREFERRED EMBODIMENT

The nature and principles of the present invention will be understood by reference to the sole FIGURE of the drawing which shows diagrammatically an apparatus of the invention as viewed along the axis of the welded pipes.

Referring to the sole FIGURE of the drawing, the apparatus for removing a welding bulge from resistance welded pipes comprises a ring-shaped carrier 1 adapted to be placed at the weld zone in spaced circumferential relationship to the welded pipes. The carrier is preferably of a disk-like shape composed of two half sections 1a and 1b articulated at one end thereof, and has a central opening 2 of a diameter which complies with the above condition.

The carrier 1 is provided with centering rollers 3 which are arranged adjacent the periphery of the central opening 2 of the carrier 1 or the inner periphery of this same carrier. Also mounted on the carrier 1 is a clamping means, consisting of shoes 4 and 5, for radial movement relative to the center of the circumference of the welded pipes by means of hydraulic cylinders 6 together with the hydraulic cylinder disposed on the ends of half sections 1a and 1b of the carrier 1. It is to be noted that the number of the centering rollers is for illustrative purposes only in the present disclosure, and one skilled in the art can easily find some other solution as to the number of the rollers and their arrangement.

Mounted on the carrier 1 are two milling cutter units 7 and 8, which are arranged on the half sections 1a and 1b respectively, and furnished with former rollers 9a and 9b.

The rolls 9a are arranged at one side of the milling cutter unit and are intended to run along the welded pipe surfaces, while the rollers 9b are arranged at the other side. The milling cutter units will be described hereinafter in greater detail.

According to the invention, the carrier 1 is provided with a circumferential guideway 10 and a gear rim 11, both being adjacent its outer periphery. The apparatus is also furnished with motor-operated carriages designated by reference numerals 12 and 13, and each comprising a frame 14 supported by support rollers 15, a driving gear wheel 16 and an electric motor 17 for setting in motion the gear wheel 16. In the sole FIGURE of the drawing, the support rollers 15 and the driving gear wheel 16 are respectively brought into engagement with the circumferential guideway 10 and the gear rim 11, the support rollers 15 being arranged and in engagement with the circumferential guideway 10 at both sides thereof.

According to the invention, the carriages 12 and 13 carry the milling cutter units 7 and 8 respectively, which units are articulated therewith and spring-loaded by springs 18. The milling cutter units 7 and 8 are operated by electric motors 19 through a belt drive as at 20. When the carriages 12 and 13 are set in motion, the milling cutter units 7 and 8 are moved in a path following the profile of the welded pipes since the milling cutter units and the rollers 9a are arranged so that the latter roll over the pipes. The carrier 1 is furnished with cams 21 arranged in diametrically opposite fashion on the carrier. The arrangement, wherein the carriages 12 and 13 are each on every half section of the carrier 1 as well as the cams 21, has been found as most suitable, and same is illustrated in the drawing.

Having thus described the apparatus of the invention, description of that for which the rollers 9b are aimed is in order. As the rollers 9a run over the surface of the welded pipes, the rollers 9b do not run into any obstacle until they reach cams 21 when they change the direction of their movement, shifting farther from the center of rotation, and drive the milling cutter units from the pipe surface, thereby terminating the machining of the weld.

The weld bulge is removed as follows.

The apparatus of the invention may be moved by any suitable vehicle. One of the sequence of butt joints in a pipeline having been welded, the carrier 1 is placed at the bulge zone on the pipes, such as shown in the drawing cross-sectioned and designated by reference numeral 22.

It is to be understood that the carrier 1 will be supported by means of the centering rollers, namely the rollers 3, on the pipes having been preliminarily fixed by shoes 4 and 5 through the use of the hydraulic cylinder 6.

In operation, the carriages 12 and 13 running along the periphery of the carrier 1 clear the cams 21 and the milling cutters of the units 7 and 8, are set in rotational motion by the electric motors 9, and approach the weld bulge by springs 18 so as to cut or incise into an upset or bulge metal till the former rollers 9a come in contact with the surface of the pipes 22.

In this manner, the cutting tools approach the weld bulge.

The carriages 12 and 13 running along the outer periphery of the carrier 1 feed the cutting tools along the weld.

The cutting tools are fed when the carriages run along one half of the outer periphery of the carrier 1, inasmuch as having run that half of the path each of the two milling cutters 7 and 8 machine half the weld length.

At the end of travel of the carriages, the milling cutter units 7 and 8 are moved away from the surface of the pipes 22 due to the interaction of the rollers 9b and the cams 21.

As hereinabove disclosed, the apparatus of the invention is simple in construction, offers good service conditions, and the setups are less time-consuming. This permits more efficient utilization of such apparatus in laying pipelines.

While the invention has been described in terms of the preferred embodiment, numerous variations may be made in the apparatus illustrated in the drawings and herein described without departing from the invention as set forth in the appended claim.

What is claimed is:

1. An apparatus for removing a welding bulge from resistance or the like welded pipes, which comprises:

a split ring-shaped carrier having two articulated half sections, adapted to be placed about the bulge zone in spaced circumferential relationship to said resistance welded pipes and having a circumferential guideway and gear rim adjacent the outer periphery of said carrier and extending the length thereof, at least two cams disposed on said carrier in diametrically opposing relationship, and centering rollers disposed on said carrier and in contact with said pipes for supporting said carrier;

clamping means mounted on said carrier for fixing the carrier on said resistance welded pipes;

at least two motor-operated carriages, each including support rollers to carry a said carriage and a driving gear wheel brought respectively into engagement with the gear rim of said carrier for moving said carriages along said circumferential guideway;

a milling cutter unit, comprising a milling head and a cutter, on each of said carriages adapted to be moved to and from the welding bulge; and former rollers located in diametrically opposite positions and being rigidly connected to a milling head with a cutter to lead the cutter in paths following the profile of the resistance welded pipes, and at the beginning and the end of motion cams attached to said carrier are used to shift said former rollers farther from the center of rotation about said pipes and thus drive said milling cutters from the pipe's surface, thereby terminating the removal of the welding bulge.

* * * * *